US006836204B2

(12) United States Patent
Reid et al.

(10) Patent No.: US 6,836,204 B2
(45) Date of Patent: Dec. 28, 2004

(54) ELECTRIC MOTOR WINDING INSULATION METHOD AND APPARATUS

(75) Inventors: Ray Thomas Reid, King Mountain, NC (US); Jeffrey A. Hudson, Greer, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 142 days.

(21) Appl. No.: 10/062,987

(22) Filed: Jan. 31, 2002

(65) Prior Publication Data

US 2003/0179066 A1 Sep. 25, 2003

(51) Int. Cl.[7] .............................................. H01F 27/30
(52) U.S. Cl. ........................................ 336/206; 29/605
(58) Field of Search ................................ 336/205–209; 310/208; 156/52–56; 29/604–606

(56) References Cited

U.S. PATENT DOCUMENTS

| | | | | |
|---|---|---|---|---|
| 3,042,743 A | * | 7/1962 | Jones | ..................... 174/120 R |
| 3,048,651 A | * | 8/1962 | Howard et al. | ....... 174/120 SR |
| 3,079,519 A | * | 2/1963 | Kitson, Jr. et al. | .......... 310/208 |
| 3,750,273 A | * | 8/1973 | Beddows | ..................... 29/596 |
| 3,868,766 A | * | 3/1975 | Gramlich et al. | ............. 29/596 |
| 4,008,409 A | * | 2/1977 | Rhudy et al. | ................. 310/45 |
| 4,376,904 A | * | 3/1983 | Horrigan | .................... 310/208 |
| 4,734,976 A | * | 4/1988 | Matson | ........................ 29/606 |

* cited by examiner

Primary Examiner—Tuyen T. Nguyen
(74) Attorney, Agent, or Firm—Patrick S. Yoder; Alexander M. Gerasimow

(57) ABSTRACT

A technique is provided for insulating a winding or coil for an electrical machine such as a motor. The coil is wound and placed in a taping station. Multiple layers of insulating tape are applied along an end region with leads bent back from the end region. The taping station permits the leads to be then placed over the insulated end region, and the main body region of the coil is similarly taped in a continuous uninterrupted manner. The tape wrap pitch may be varied along certain regions, where increased dielectric strength is desired. Following the insulating tape application, an armor tape may be applied over both the end region and the main region of the coil in a continuous uninterrupted manner. The coil can then be finished and assembled in a machine such as an electric motor stator.

26 Claims, 4 Drawing Sheets

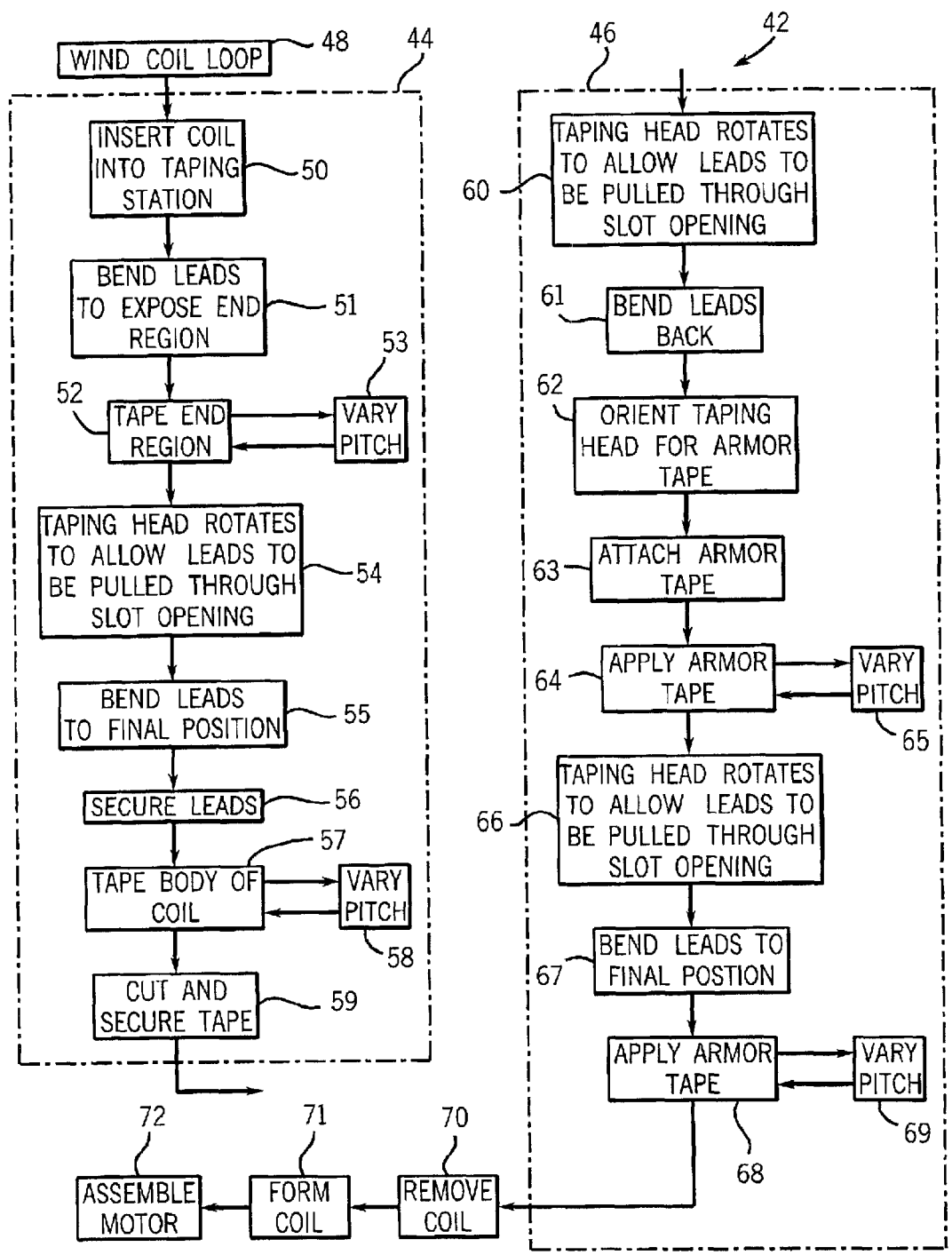

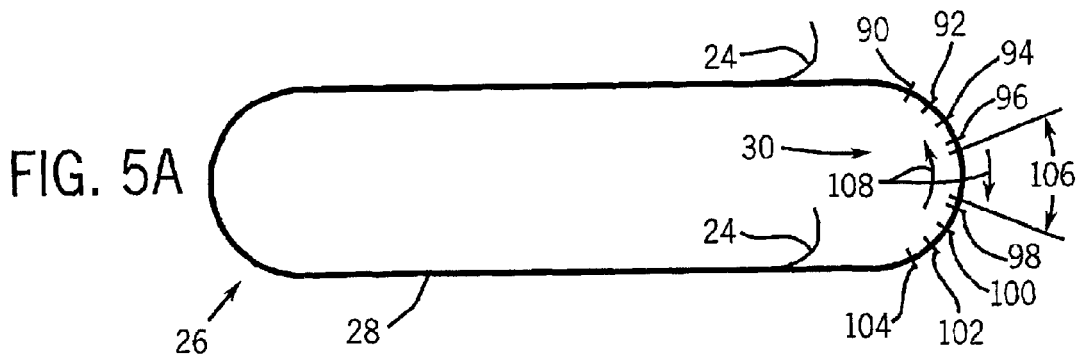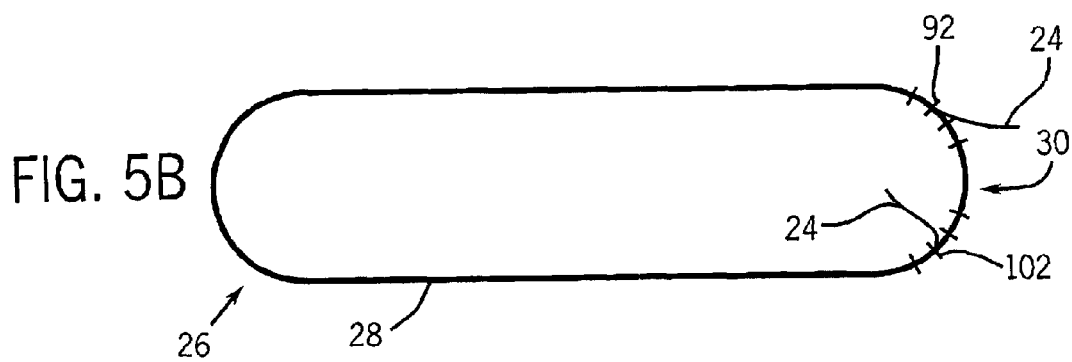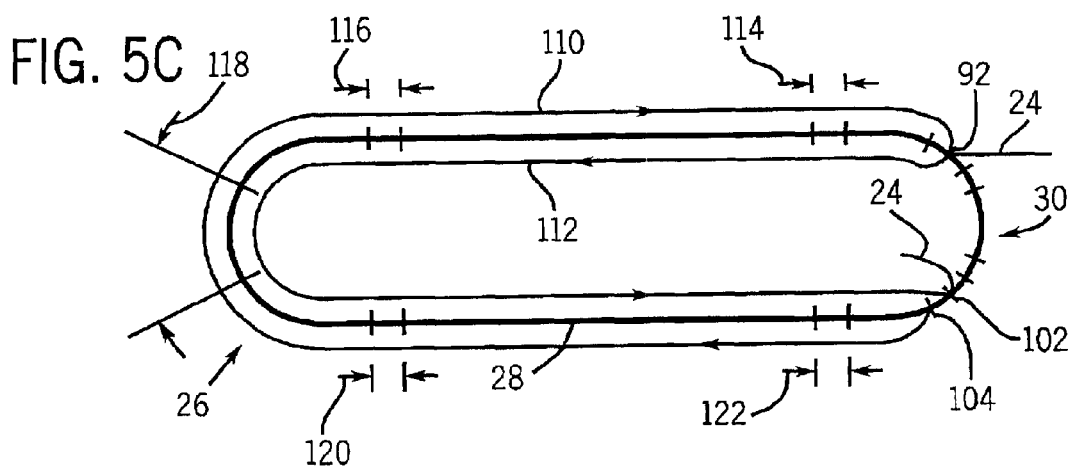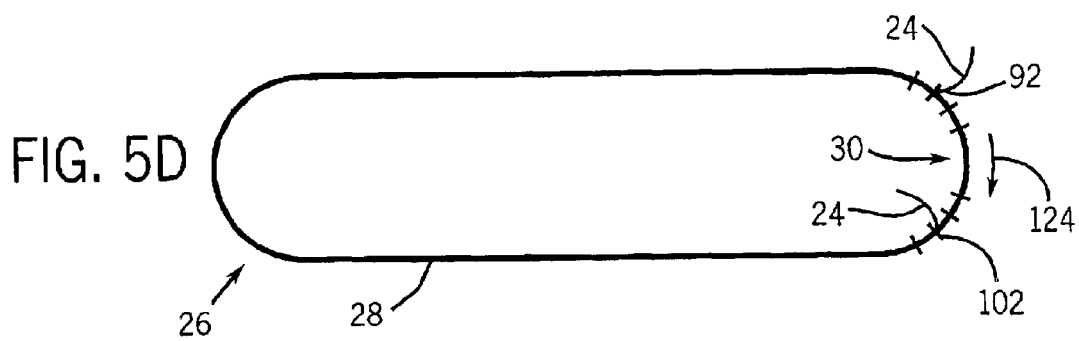

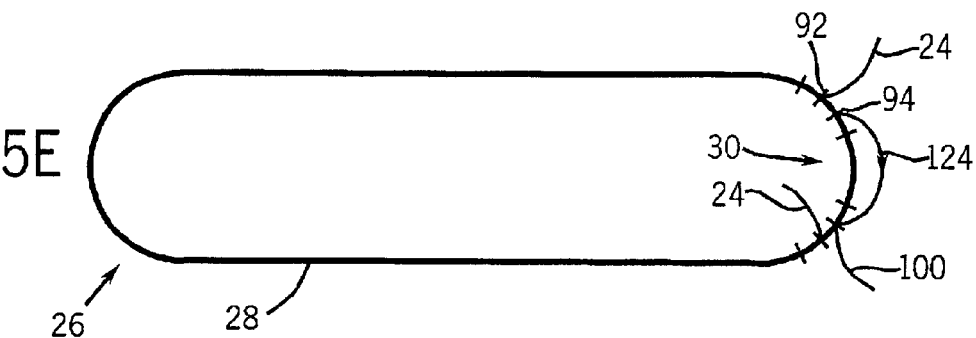
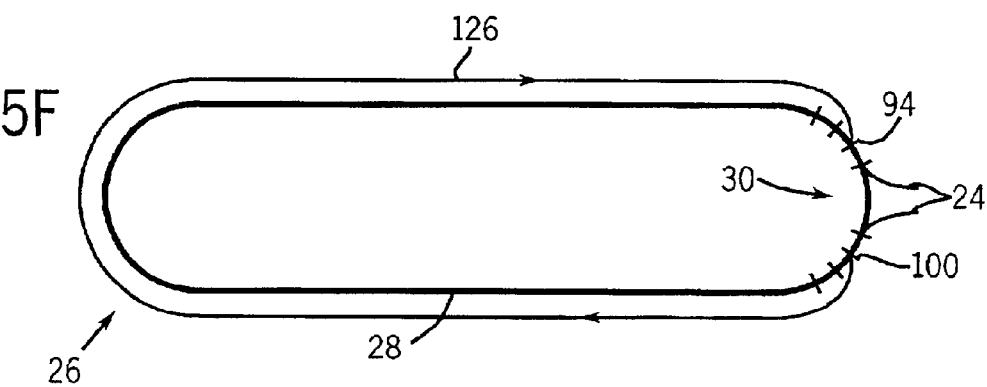
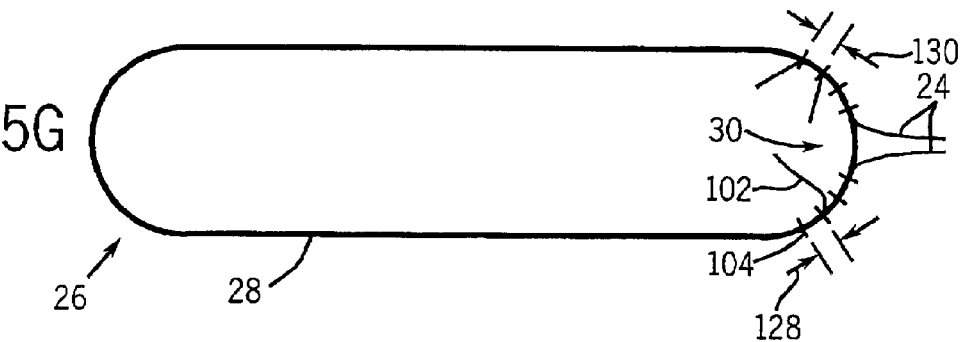

ELECTRIC MOTOR WINDING INSULATION METHOD AND APPARATUS

BACKGROUND OF THE INVENTION

The present invention relates generally to the field of electrical machines, such as electric motors. More particularly, the invention relates to a technique for insulating windings or coils in such machines to improve their construction, performance and useful life.

A wide range of applications exist for electric motors, generators, and similar rotating electrical machines. In a vast array of industrial, consumer and other applications, for example, electric motors are used as a prime mover for pumps, material handling equipment, process equipment, drives, and so forth, to mention just a few. In general, such machines include a housing in which a stator is statically positioned. A rotor is dynamically mounted within the stator and is inductively driven in rotation by an oscillating electric power source applied to coils or windings of the stator. The stator windings are typically disposed within radial slots to create controllable magnetic fields which are forced to rotate by appropriate application of power to the windings during operation. An output shaft coupled to the rotor serves as an interface for driving other equipment in the particular application.

One challenge in designing and assembling electrical machines such as electric motors is in the specific design and assembly of the machine's magnetic coil windings. Stator windings specifically, may be formed as a series of turns of electrically conductive wire, or of a single-piece bar. In either case, leads extending from an end of the coil winding serve to accept electrical power applied to the coils during operation. However, the coil must generally be electrically isolated (i.e. insulated) from the stator core in which it is installed, as well as from other electrically conductive portions of the machine and housing, and from other coils installed within the machine.

To provide insulation at such locations, prior art techniques included winding of insulative tapes around the magnet wire, coil or portions of the coil. In a typical process, for example, a region between end leads of the coil is covered with a series of progressive wraps of an insulating tape. The insulating tape is then cut and secured following wrapping around the coil end region. The leads may then be bent back into place over the end region, and the taping process is restarted around a main body portion of the coil. The insulating tape is then cut and re-secured after taping this portion of the coil. These operations may be performed by hand, or in a specially designed machine. Typically, some of the operations are performed in the machine, while operator intervention may be required during certain steps in the process. When the operation is completed by hand, a continuous insulation of the lead may be obtained. However, hand taping the coil compromises dielectric properties and severely limits manufacturing throughput.

Current techniques for tape insulation of machine coils of the type described above suffer from a number of drawbacks. For example, the process may result in excessive layering of insulation material at a point where the lead exits the coil. In accordance with the present technique, it is believed that this is caused or aggravated by cutting the insulating tape between the process for insulating the end region and that for insulating the main body portion of the coil. The process also can result in loss of time in severing the insulating tape, positioning the tape for covering the main body portion of the coil, and restarting the wrapping process for the main body portion. The lead seal junction may also be somewhat compromised, sometimes resulting in less than optimal dielectric properties in the area where the tape wraps are stopped and restarted around the coil leads. Such reduced dielectric strength can, in turn, result in a shortened life of the coil, the stator and the overall machine in which these are installed.

Therefore, there is a need for an improved technique for insulating windings, coils and similar structures in electric machines. There is a particular need, at present, for a technique which facilitates continuous machine insulation of coils, while avoiding the drawbacks of existing techniques, particularly in insulating of locations where leads exit a main coil body.

SUMMARY OF THE INVENTION

The present invention provides an improved technique for insulating machine coils designed to respond to such needs. The technique may be applied in a wide range of settings, but is particularly well-suited for machine insulation of electric motor coils through the use of multiple layers of insulating tape. The tape may be applied from one or more sources, typically tape spools or similar repositories. The coil leads are displaced from the end region of the coil and insulating tape is wrapped around this section of the coil body. The coil leads may then be attached back to the insulated end region, and winding of tape over a main region of the coil continued without severing or interrupting the insulating tape. Regions of the coil may be covered with a plurality of wraps of insulating tape, particularly at regions where additional dielectric strength is desired, or where friction or wear may take place. Moreover, a pitch of tape wraps may be varied at one or more locations along the end region adjacent to the leads, or elsewhere on the main region of the coil. An armor tape may be applied over all or a portion of the insulating tape to finish the insulating tape application process.

The inventive technique offers distinct advantages over existing techniques. For example, the technique offers optimized dielectric properties in regions adjacent to the location where coil leads separate from the main region and end region of the coil. The technique also offers a rapid and cost-effective solution for improved insulation of coils in machine taping applications. The technique is more efficient and cost effective than existing techniques in which tapes are severed or cut and reapplied to a main body region of a coil. Following insulation of the coil in accordance with the present techniques, the coil may be processed and installed in a machine, such as an electric motor, in any one of a variety of configurations, such as to form single-phase or three-phase electric motors, generators, dynamos, and so forth.

BRIEF DESCRIPTION OF THE DRAWINGS

The foregoing and other advantages and features of the invention will become apparent upon reading the following detailed description and upon reference to the drawings in which:

FIG. 4 is a flow chart illustrating steps in an exemplary process for insulating a coil in accordance with the present technique; and FIGS. 5A–5G are diagrammatical representations illustrating exemplary steps in insulating a coil in accordance with the present technique as summarized in the flow chart of FIG. 4.

DETAILED DESCRIPTION OF SPECIFIC EMBODIMENTS

Figure 1:
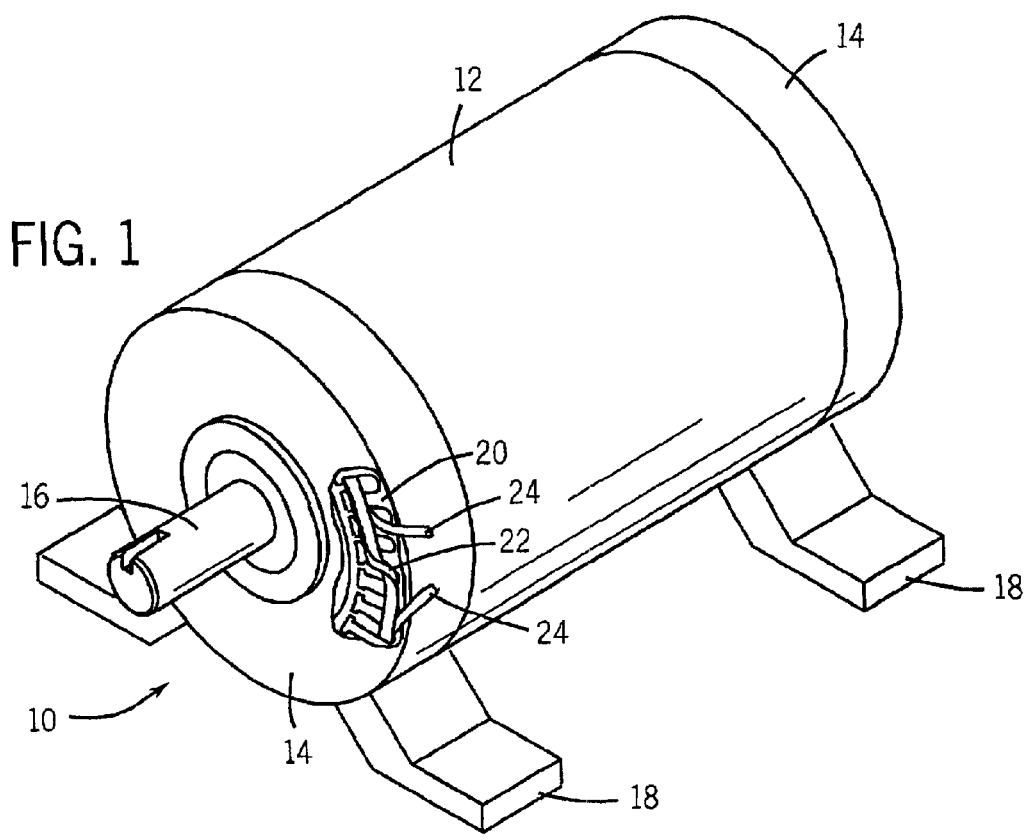
FIG. 1 is a perspective view of a typical electric motor illustrating installation of a single stator winding in a stator core in accordance with the aspects of the present technique.

Turning now to the drawings, and referring first to FIG. 1, an electrical machine is illustrated in a form of an electric motor 10. While the example of an electric motor is used in the present description to illustrate the coil insulating techniques of the present invention, it should be noted that a variety of other machines may benefit from the present techniques, including generators, dynamos, and so forth. In the embodiment illustrated in FIG. 1, motor 10 includes a housing 12 on each end of which an end bracket 14 is provided. A shaft 16 is dynamically mounted within the housing and forms a portion of a rotor assembly which is driven in rotation upon appropriate application of electric power to the motor. The motor housing may be any suitable type, and may include mounting features, such as mounting feet 18 in the illustrated embodiment. A stator 20 is positioned within housing 12 and serves to cause rotation of the rotor assembly upon application of electrical power to a plurality of coils installed in the stator. In general, such coils are positioned within radially-extending slots of the stator core. One such coil 22 is illustrated in FIG. 1 for exemplary purposes. To permit connection of the coils within the winding, a pair of leads 24 exits each coil.

As will be appreciated by those skilled in the art, wide variety of motor configurations may be formed based upon the overall configuration described above. For example, stators having various numbers of slots may be formed, and coils may be disposed in the stator slots in concentric, lapped, or a combination of mechanical or electrical configurations, depending upon the manner in which the stator core is constructed and the electrical design of the machine. Moreover, the leads 24 of the coils may be interconnected in a variety of manners, such as to form single-phase or multiple-phase machines, and within these configurations to have a variety of numbers of poles, typically two-pole, four-pole, six-pole, and so forth. Finally, the coils may be grouped by interconnection of the leads to provide Y-wound/connected or delta-wound/connected configurations.

Figure 2:
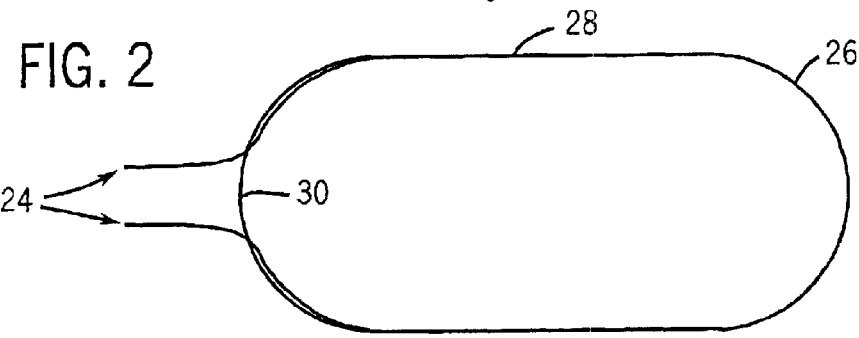
FIG. 2 is a diagrammatical representation of a single pre-fabricated winding shape used in an electric motor such as that illustrated in FIG. 1.

The particular arrangement of the coils 22 may vary also depending upon the application. A typical pre-fabricated coil 26 is illustrated generally in FIG. 2. In presently contemplated configurations, the coil may be wound from a conductive wire, such as copper or a copper alloy. Such coils may contain a range of numbers of wraps of wire, depending upon the wire dimensions, the specifications for current and voltage levels to be applied to the coils, and so forth. Moreover, within a single machine, coils of different numbers of wire wraps may be provided. Coils may also be formed of a bar-type material which may be bent into a desired configuration for installation in the stator core. In all of these cases, however, the coil 26 includes a looped body or main region 28, and an end region 30. The leads 24 exit the end region 30 from which they may be interconnected with other coils to form groups and to interface with external source circuitry as mentioned above.

Figure 3A:
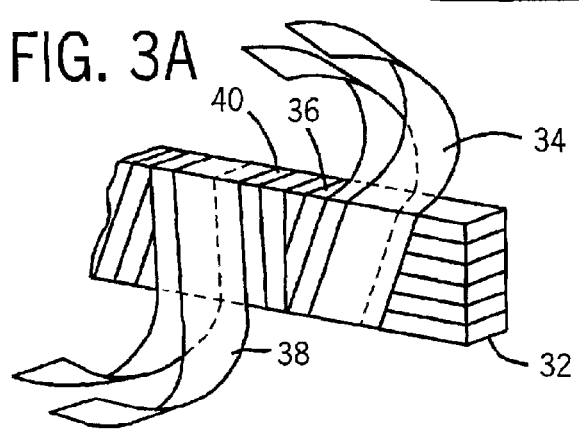
FIGS. 3A and 3B are perspective views illustrating wrapping of insulating tape around a portion of a coil for the type shown in FIG. 2.
Figure 3B:
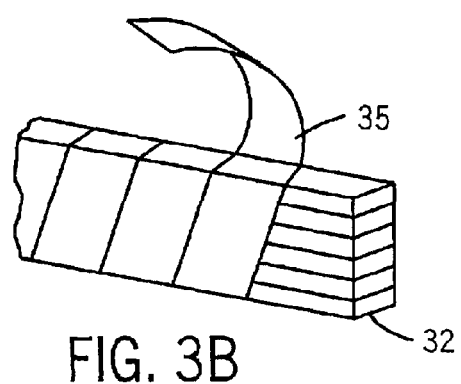

To insulate the coils from adjacent coils in the stator, from the stator core, and from other conductive components of the machine, several techniques may be employed. For example, insulating materials may be disposed within the stator core slots. However, in addition to such techniques, in the present technique the coils are wrapped with one or more insulating tapes. FIGS. 3A and 3B illustrate generally a manner in which such tapes are disposed on a portion of a coil. A coil segment 32, which again may include one or more individual conductors, first receives an insulating tape in overlapping 34 or abutting 35 turns or wraps 36. Where additional insulation is desired, additional tapes 38 may be applied, again in abutting or overlapping turns or wraps 40. As will be appreciated by those skilled in the art, the wrap pitch of the tapes may be constant or varied along some or all of the segment 32 of the coil. Similarly, the tape or tapes may be overlapped or abutted in certain regions of the coil and overlapped or abutted in different ways in other regions of the coil to achieve the desired insulating characteristics and dielectric ratings. The tapes may be subsequently processed, such as for application and curing of a resinous binder. Moreover, in present embodiments, additional tapes may be applied over the insulating tapes 34, 35 and 38, such as armor tapes (not shown).

It has been found that improvements in insulating processes and in the resulting performance of the insulation systems on such coils can be realized through processes such as that summarized in FIG. 4. In general, the process of FIG. 4 may be summarized in accordance with a series of process steps, referred to generally by the reference numeral 42. In the summary of FIG. 4, the process steps 42 may be further sub-divided into insulating steps 44, and armoring or finishing steps 46. The steps are preferably carried out on a taping machine or station in which one or more insulating tapes may be wrapped in an automatic or semi-automatic fashion. As summarized below, at certain stages in the process, an operator may be prompted to attach insulating tape, position leads, and apply the desired wraps of tape in specific locations and in specific relationships with other wraps of tape on the coil.

In the process steps summarized in FIG. 4, a coil loop is first wound as indicated at step 48. The coil, as noted above, may be wound by any appropriate technique, such as by machine or hand winding of a series of wraps of an electrical conductor, or by bending of a conductive bar. At step 50 the coil is inserted into a taping station. As will be appreciated by those skilled in the art, taping station includes structures for holding the coil in place, and for wrapping multiple layers of tape around the coil windings. In a present embodiment, the taping station further includes a taping head which includes a slot or opening through which the leads can be positioned during various phases of the taping process described below.

FIGS. 5A–5G represent diagrammatically the various positioning and taping steps summarized in FIG. 4 on a typical coil. Referring first to FIG. 5A, when the coil is positioned in the taping station as noted above at step 50 of FIG. 4, various points along the end region 30 will be available for reference in the taping and lead positioning steps. In FIGS. 5A–5G, these points have been labeled 90, 92, 94, 96, 98, 100, 102 and 104.

Once the coil has been placed in the taping station, the leads are bent to expose the end region 30 as summarized at step 51 in FIG. 4. As shown in FIG. 5A, the leads 24 are bent back to expose all of the reference points 90–104 of region 30. The process then proceeds to step 52 of FIG. 4, wherein the end region is taped. In a presently preferred embodiment, two separate rolls or spools of tape are used to simultaneously wrap the end region 30 from point 104 of FIG. 5A to point 90. Two separate tapes are thus applied to create a helical insulating wrap which is varied in pitch over a portion of the end region as denoted at reference number 106 in FIG. 5A and step 53 in FIG. 4. The tapes are wound back along the same region as denoted by arrows 108 in FIG. 5A. Thus, following steps 52 and 53 in FIG. 4, four layers of tape will have been applied to end region 30.

At step 54 in the process, the taping head of the taping station is automatically rotated forward to the open slot position so that the leads can be pulled through the slot provided therefor in the taping head. Advancing to step 55 in FIG. 4, following taping of the end region, the leads 24 are bent back to a final position partially overlapping the taped end region. This configuration is shown in FIG. 5B, wherein the leads 24 are shown positioned over points 92 and 102. The leads may then be secured to these points as indicated at step 56 in FIG. 4. With the leads thus secured in place, the body portion of the coil is taped as indicated at step 57. Referring to FIG. 5C, beginning at point 104, two layers of tape are applied from point 104 around the entire main portion of the coil up to point 92. From this point the helical wrapping continues back along the body region of the coil to point 102. Thus, a total of four layers of insulating tape are provided on the main body region of the coil in the present embodiment, thereby achieving a continuous, uninterrupted and progressive layering of insulating tape around the entire periphery of the form coil body.

As summarized at step 58 in FIG. 4, the pitch of the helical windings is varied at certain regions along the coil. In the embodiment illustrated in FIG. 5C, for example, the pitch of the helical wraps of tape is varied in a region 118 opposite end region 30. The pitch is also varied at a series of additional regions 114, 116, 120 and 122. Following taping of the main body region, the tape head is automatically stopped at point 102 and the operator is prompted to cut and secure the tape to the coil. This step is summarized at reference numeral 59 in FIG. 4.

After the insulating tape has been applied to the coil, the application of armored tape may begin as summarized by the sequence of steps 46 in FIG. 4. This sequence of steps begins at step 60 wherein the taping head is automatically rotated to allow the leads to be pulled through the slot opening as before. As illustrated in FIG. 5D, the leads 24 are pulled back to points 92 and 102. This step is indicated at reference numeral 61 in FIG. 4. The taping head is then oriented for application of armor tape as indicated at step 62 in FIG. 4. For this operation the taping head is positioned at point 94 as shown in FIG. 5E. At step 63 (see FIG. 4), the armor tape is attached at point 94 and armor tape is wrapped around the end region as indicated by arrow 124 in FIG. 5E, and as noted at step 64 in FIG. 4. In the present embodiment the armor tape is applied from point 94 to point 100 along the end region with varied pitch as indicated in step 65 of FIG. 4.

As summarized at step 66 in FIG. 4, the taping head is then automatically rotated to allow the leads to be pulled through the slot opening. The leads are bent into a final position as indicated at step 67, and as shown generally in FIG. 5F. With the leads thus positioned, the armor tape is applied to the main region of the coil as summarized at step 68 in FIG. 4. The pitch of the helical wrap is varied at certain regions along the coils as indicated in step 69 of FIG. 4. Returning to FIG. 5F, and as indicated at arrow 126, the armor tape is thus applied from point 100 over the entire main region of the coil to point 94. In the present embodiment a single layer of armor tape is thus applied over the insulating tape both in the end region 30 and over the entire body region 28 in a continuous and uninterrupted manner. The tape pitch may be constant or varied for the armor tape, and in the present embodiment the tape pitch will be edge-lapped along the lengths of the sides of the main region of the coil. Following the taping operations, it will be noted that five layers of tape will be provided in regions 128 and 130 as indicated in FIG. 5G. The amounts, thicknesses and disposition of the tapes may be varied, however, depending upon the application and the desired dielectric rating.

Following the armor taping, again as summarized in FIG. 4, the coil is removed from the taping station as indicated at step 70. The coil may then be formed into a desired configuration, as indicated at step 71. Once similar coils have been insulated and formed in a similar manner, the coils may be assembled in the machine as indicated at step 72. Such final processing and assembly may include finishing steps for the insulating system, such as application of resinous or other binders, curing, and so forth. As noted above, the coils can be installed and interconnected in the machine to form various configurations, including single and three-phase motor stators and similar devices.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. By way of example, any suitable tapes may be employed in the present techniques, such as a mica tape available commercially under the designation Nomex from DuPont, and a glass, fiberglass, or polyester armor tape. Again, however, any other suitable tape or tapes may be used that provide the desired dielectric or protective properties.

What is claimed is:

1. A method for insulating a coil for an electrical machine, the method comprising:
    insulating an end region of the coil by wrapping at least one insulating tape over the end region;
    securing leads of the coil at least partially over the insulated end region; and
    insulating a main region of the coil by wrapping the at least one insulating tape over both, the main region and at least a portion of the leads over the end region, wherein the wrapping is carried out in a continuous operation without severing the insulating tape in an automated form coil manufacturing process.

2. The method of claim 1, wherein a second insulating tape is wrapped over the end region prior to insulating the main region.

3. The method of claim 1, wherein each lead is displaced from the end region to a first point to permit wrapping of a second insulating tape over the end region.

4. The method of claim 3, wherein each lead is displaced to a second point at least partially overlapping the insulated end region to permit wrapping of the second insulating tape over the main region.

5. The method of claim 1, further comprising varying a pitch at which a first and/or second tape is wrapped over at least a portion of the end region.

6. The method of claim 1, further comprising varying a pitch at which a first and/or second tape is wrapped over at least a portion of the main region.

7. The method of claim 1, further comprising wrapping an armor tape over at least a portion of the end region and a portion of the main region.

8. The method of claim 7, wherein a pitch of the armor tape is varied over at least a portion of the end region and/or the main region.

9. A method of insulating a coil for an electrical machine, the method comprising:

exposing an end region of the coil by displacement of leads from the end region;

taping the end region with at least two insulating tapes;

overlapping the leads with a portion of the end region; and continuously taping a main region of the coil and at least a portion of the leads over the end region with the at least two insulating tapes without severing the insulating tapes.

10. The method of claim 9, wherein the end region is taped with two insulating tapes.

11. The method of claim 10, wherein the main region is taped with two insulating tapes.

12. The method of claim 9, further comprising displacing the leads partially from the end region following the end region taping step, and applying armor tape over the two insulating tapes.

13. The method of claim 9, wherein the leads are secured over a portion of the end region following the step of overlapping.

14. The method of claim 9, wherein a pitch of wraps of the two tapes and/or armor insulating tape is varied in at least a portion of the end region.

15. The method of claim 9, wherein a pitch of wraps of the two tapes and/or armor insulating tape is varied in at least a portion of the main region.

16. A method for insulating a coil for an electrical machine, the method comprising:

wrapping a first insulating tape over an end region of the coil;

disposing leads of the coil at least partially over an insulated end region;

wrapping the first insulating tape over a main region of the coil and at least a portion of the leads over the end region, wherein the wrapping is carried out in a continuous operation without severing the insulating tape in an automated form coil manufacturing process;

displacing the leads from the end region to permit wrapping of a second insulating tape over the end region; and disposing the leads at least partially over a second insulated end region to permit wrapping of the second insulating tape over both the main region and at least a portion of the leads over the second insulated end region.

17. The method of claim 16, further comprising varying a pitch at which a first and/or second tape is wrapped over at least a portion of the end region.

18. The method of claim 16, further comprising varying a pitch at which a first and/or second tape is wrapped over at least a portion of the main region.

19. The method of claim 16, further comprising wrapping an armor tape over at least a portion of the end region and a portion of the main region.

20. The method of claim 19, wherein a pitch of the armor tape is varied over at least a portion of the end region and/or the main region.

21. A method of insulating a coil for an electrical machine, the method comprising:

exposing an end region of the coil by displacement of leads from the end region;

taping the end region with at least two insulating tapes;

applying armor tape over the insulating tapes in the end region;

overlapping the leads with a portion of the end region; and continuously taping a main region of the coil and at least a portion of the leads over the end region with the insulating tapes without severing the insulating tapes.

22. The method of claim 21, wherein the end region is taped with two insulating tapes.

23. The method of claim 21, wherein the main region is taped with two insulating tapes.

24. The method of claim 21, wherein the leads are secured over a portion of the end region following the step of overlapping.

25. The method of claim 21, wherein a pitch of wraps of the two tapes and/or armor insulating tape is varied in at least a portion of the end region.

26. The method of claim 21, wherein a pitch of wraps of the two tapes and/or armor insulating tape is varied in at least a portion of the main region.

* * * * *